Patented Nov. 6, 1951

2,573,960

UNITED STATES PATENT OFFICE 2,573,960

DRILLING FLUID CONCENTRATES

Paul W. Fischer, Long Beach, Calif., assignor to Union Oil Company of California, Los Angeles, Calif., a corporation of California No Drawing. Application April 22, 1949,
Serial No. 89,145

14 Claims. (Cl. 252—8.5)

This invention concerns drilling fluids employed in the drilling of oil and gas wells, and in particular relates to concentrate compositions adapted to being dispersed in mineral oil or the like to obtain drilling fluids of the oil-base type. It further relates to a method for preparing such compositions.

The use of drilling fluids or muds in drilling oil and gas wells by means of rotary drilling methods is a well-known and widely used procedure. During the drilling operation such fluids are continuously circulated down through the bore and back to the surface, and serve to cool and lubricate the drill bit as well as to suspend and remove cuttings from the bore and to prevent the flow of liquids from formations traversed by the bore into the same by applying hydrostatic pressure to such formations. In locations where the underground formations traversed and/or penetrated by the bore contain materials such as hydratable clays which swell and/or disintegrate in the presence of water, it has become customary to employ drilling fluids which are substantially free of water. Such fluids are termed "oil-base" fluids since they usually comprise a mineral oil having dispersed or suspended therein minor proportions of various agents adapted to impart special properties to the composition. Among such agents, those most universally employed are weighting agents, which are high density inert solids adapted to increase the density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents of the nature of metal soaps which serve to maintain solid components of the fluid uniformly dispersed therein. Such fluids may also contain a variety of other agents such as gel strength improvement agents, viscosity modifiers, emulsifying agents, colloids, inorganic salts, etc.

While the preparation of oil-base drilling fluids is a comparatively simple matter, usually involving merely dispersing the proper amounts of the various addition agents in the base oil with the aid of suitable agitation, conditions at the well site frequently are unfavorable even to such a simple operation. Accordingly, it has been proposed that the addition agents be blended in the required proportions to form a concentrate composition which can readily be transported to the well site and there be dispersed in the base oil to form the drilling fluid without the use of any but the most rudimentary equipment. The use of a concentrate composition in this manner is often of further advantage since in many instances the base oil in which it is subsequently dispersed may be crude oil which is available at or near the well site. Similarly, there is often available near the well site a material such as silica or clay which may be employed as a weighting agent. It will thus be seen that the provision of a suitable drilling fluid concentrates would greatly facilitate the preparation of the drilling fluid at the well site, and in many cases would secure important savings in the cost and time involved in transporting the fluid to the well. However, in attempting to prepare suitable drilling fluid concentrates, particularly those in which a soap-type of dispersion agent or sedimentation inhibitor is employed, it has been found that the concentrate usually takes the form of a heavy grease-like solid which is disagreeable and inconvenient to handle and not nearly as readily dispersible in the base oil as could be desired. It is of course possible to reduce the viscosity of such concentrates and render them sufficiently fluid by including in their composition a part of the base oil or by diluting them with a light solvent, but such procedure requires the use of relatively large amounts of the base oil or solvent and thus defeats, at least in part, the purpose for which the concentrates are provided.

It is accordingly an object of the present invention to provide drilling fluid concentrates which can readily be dispersed in mineral oil or the like to form oil-base drilling fluids.

Another object is to provide drilling fluid concentrates sufficiently fluid to permit easy handling and very ready dispersion in mineral oils and the like.

A further object is to provide means for reducing the viscosity of drilling fluid concentrates without the use of large quantities of diluents.

A still further object is to provide an agent capable of reducing the viscosity of drilling fluid concentrates when employed in only minor amounts.

Other objects will be apparent from the following detailed description of the invention, and various advantages not specifically referred to herein will occur to those skilled in the art upon employment of the invention in practice.

I have now found that the above and related objects may be achieved by providing drilling fluid concentrates comprising a small quantity of a glycol such as ethylene glycol and the like. More particularly, I have found that the viscosity of certain types of drilling fluid concentrates which are normally of a heavy grease-like consistency, e. g., concentrate compositions comprising relatively large amounts of heavy or alkaline-earth metal resinates or naphthenates and smaller amounts of clay, may be markedly reduced by including in such compositions a small amount of a glycol. The compositions so formulated are liquids of sufficient fluidity to be handled by light-duty pumping equipment, and may be very readily dispersed in mineral oils to form oil-base drilling fluids of excellent quality. Such compositions are stable over long periods of time and may be stored indefinitely and shipped in ordinary metal containers or drums to the point of use where they may be diluted with from as much as 5 to 15 times their weight of locally available oil to obtain the desired drilling fluid. They may or may not comprise a weighting agent depending upon whether such agent is desired in the drilling fluid and whether materials suitable for use as weighting agents are available at or near the point of use.

The invention thus comprises drilling fluid concentrate compositions essentially comprising a major proportion of a heavy or alkaline-earth metal resinate or naphthenate, a minor proportion of clay, and a viscosity-reducing amount of a glycol. As hereinafter more fully explained, such compositions may also comprise a light oil, such as gas oil or kerosene, as well as weighting agents and minor amounts of other agents adapted to provide special properties in the ultimate drilling fluid. The invention also comprises a particularly advantageous method for making such drilling fluid concentrates.

The metal soap which comprises a major proportion of the drilling fluid concentrates provided by the invention may be any heavy or alkaline-earth metal resinate or naphthenate. Of such metals, those of groups II and III of the periodic table are usually the most suitable, with those of group II, i. e., the alkaline-earth metals, being preferred. Calcium resinate, by reason of the excellent properties it provides in the ultimate drilling fluid, is particularly advantageous, and may readily be obtained by reaction between a basic calcium compound, such as hydrated lime, and an alkali-metal metal resinate, a number of which are available commercially. A particularly preferred calcium resinate may be prepared in this manner by reacting one part by weight of a slurry containing approximately equal parts by weight of water and hydrated lime with about five parts by weight of the potassium soap of partially decarboxylated wood rosin. The resulting product comprises calcium resinate together with a small quantity of water as well as the neutral rosin oils initially incident in the potassium resinate. As is more fully described hereinafter, such product may advantageously be formed in situ by carrying out the reaction for its formation in the presence of other ingredients of the composition. The same techniques may be applied to the formation of other metal resinates or naphthenates, or, if desired, a basic compound of the metal, e. g. the oxide, hydroxide, or basic salt, may be reacted directly with the resin or naphthenic acid in accordance with known procedure. Alternatively, the metal resinates and naphthenates of the present class may be employed directly if commercially available. It is to be understood that the term "resinate" as herein employed refers to the salts or soaps of any rosin acid, including abietic acid, wood rosin, gum rosin, and rosins which have been modified as by partial decarboxylation, hydrogenation, polymerization, disproportionation, or by reaction with a conjugated unsaturate such as maleic anhydride. It will further be understood that the products herein referred to as metal resinates include the impurities normally incident with the actual metal salt or the resin acid.

In addition to the metal soap ingredient, the compositions provided by the invention also essentially comprise a hydratable clay which ultimately serves to impart wall-building properties to the drilling fluid. Such clay is preferably a high quality material such as bentonite, montmorillonite, or kaolinite, but may be common clay such as is naturally available in almost any locality.

Any of the various known glycols may be employed to reduce the viscosity of the composition as provided by the invention. As examples of suitable glycols there may be mentioned ethylene glycol, propylene glycol, butylene glycol, diethylene glycol, triethylene glycol, tetra-ethylene glycol, etc. For reasons of economy and general availability, however, those containing not more than six carbon atoms are most suitable, with ethylene glycol and diethylene glycol being preferred.

In addition to the essential soap, clay, and glycol components, the concentrate compositions of the invention may advantageously comprise a substantial quantity of a light oil or distillate fraction such as gas oil, kerosene, naphtha, etc. Such oil promotes homogeneity of composition in the concentrate and serves to reduce the viscosity of the drilling fluid prepared from the concentrate. The latter effect is often highly desirable, as for example when the base oil employed for diluting the concentrate is of rather high viscosity, e. g., a moderately heavy crude oil or a residuum material. As previously mentioned, the new compositions may also comprise minor amounts of other agents adapted to impart specific properties thereto in accordance with the usual practice in the art. They will usually also comprise as a matter of course the small amount of water which is almost invariably associated with the metal soap component.

The proportions in which the essential components of the new drilling fluid compositions are employed may be varied between relatively wide limits depending upon the properties to be desired in the ultimate drilling fluid. However, the metal soap will comprise a major proportion of the composition with the clay and glycol making up the remainder, the latter being employed in an amount sufficient to reduce substantially the viscosity of the mixture of soap and clay and render it fluid. Usually it is preferred that the composition have an API Funnel viscosity below about 500 seconds at 80° F. When it is desired that the composition also comprise a light oil or distillate, e. g. a mineral oil fraction having a boiling range of about 300°–750° F., such oil will usually be employed in an amount approximately equal to the weight of the soap. Thus, the basic composition will usually comprise from about 50 to about 75 per cent by weight of the metal soap, from about 10 to about 25 per cent by weight of the hydratable clay, and from about 2 to about 10 per cent by weight of the glycol. Such composition may be employed as such as a drilling fluid concentrate, but more preferably is first dispersed in from about 70 to about 120 per cent by weight of a light oil such as light diesel fuel.

The compositions provided by the invention may be prepared simply by blending together the various components to secure a homogeneous composition. Thus, for example, 10 to 20 parts by weight of bentonite may be mixed with 100 parts by weight of crude aluminum naphthenate with the aid of heating and stirring, and 5 to 15 parts of ethylene glycol thereafter added. The resulting composition is considerably more fluid than the soap-bentonite mixture alone, and forms a suitable drilling fluid concentrate. Usually, however, it is preferable that such mixture be dispersed in 70 to 120 parts by weight of a light oil.

As previously mentioned, the heavy or alkaline-earth metal naphthenates and resinates, particularly the latter, are often not available commercially and must be prepared from the corresponding alkali-metal soaps. In such case, it is advantageous to employ a procedure whereby the desired metal soap is formed in the presence of the other components of the concentrate composition. According to such procedure, the desired alkali-metal soap is suspended or dispersed in a light oil, such as gas oil, to which mixture there is then added the desired amount of the glycol. The quantity of basic metal compound and light oil should be so selected that the final composition comprises the metal soap and light oil in the proportions previously mentioned. In order to promote the metathesis reaction between the alkali-metal soap and the basic metal compound which is subsequently added, a small amount of water is added along with, or immediately following, the glycol. The clay is then stirred into the mixture, after which the basic metal compound is added in an amount substantially equivalent chemically to the quantity of alkali-metal soap employed. Such procedure has been found to result in a composition of superior uniformity and dispersibility in mineral oils.

In preparing a preferred composition of the present class by such preferred procedure, approximately 400 parts by weight of an alkali-metal resinate is dispersed in from about 350 to about 450 parts by weight of light mineral oil. The alkali-metal resinate is preferably the caustic potash saponification product of partially decarboxylated wood rosin. Such product comprises about 50 per cent by weight of potassium resinate and about 30 to 35 per cent by weight of unsaponifiable oils, the remainder being free resin acids and water. To the mixture of oil and alkali-metal resinate there is then added from about 50 to about 100 parts by weight of water and from about 30 to about 50 parts by weight of the glycol. From about 50 to about 150 parts by weight of a hydratable clay, preferably bentonite, are then stirred into mixture, followed by the addition of from about 35 to about 45 parts by weight of finely-divided calcium hydroxide. Efficient stirring is employed to secure a uniform composition.

The following examples will illustrate several ways in which the principle of the invention may be applied, but are not to be construed as limiting the same. All proportions are given in parts by weight.

*Example I*

To 400 parts of gas oil there is added 400 parts of the potassium soap of partially decarboxylated wood rosin. This latter product is a dark-colored highly viscous fluid comprising about 50 per cent potassium resinate, about 7 per cent free resin acids, about 33 per cent unsaponifiable oils, and about 10 per cent water, and is prepared by saponifying partially decarboxylated wood rosin with aqueous caustic potash. The gas oil is a petroleum distillate material of the light diesel fuel range having an API gravity of about 31.0°, a viscosity of about 180 SUS at 100° F., and having a distillation range of 400° to 720° F. Approximately 80 parts of water are then added, followed by 30 parts of diethylene glycol and 120 parts of bentonitic clay. Finally there is added 40 parts of finely divided hydrated lime. During the addition of the various components the mixture is stirred to insure a uniform composition. The product so prepared is of sufficient fluidity to be handled by light-duty pumps, and is readily dispersible in mineral oils of the type customarily employed as the base oil in oil-base drilling fluid formulations. Thus, for example, 1000 parts of this concentrate may be stirred into 9000 parts of a heavy residual oil having a viscosity of 30 SUS at 115° F. to obtain an unweighted drilling fluid having an API Funnel viscosity of about 70 seconds at 115° F. and an initial filter loss value of about 10 ml. at 106° F. After 24 hours' use in a well under rather mild operating conditions, the viscosity increases to an optimum value of about 160 seconds and the fluid loss value drops to substantially zero. A concentrate composition from which the diethylene glycol is omitted is a thick stiff paste.

*Example II*

Approximately 500 parts of zinc naphthenate are stirred into 500 parts of naphtha, after which there is added 75 parts of montmorillonite and 20 parts of propylene glycol. The zinc naphthenate employed is a crude product in the form of a viscous paste. The composition so prepared is of sufficient fluidity to permit easy handling by light-duty pumps.

*Example III*

| | Parts |
|---|---|
| Sodium naphthenate | 500 |
| Water | 200 |
| Bentonite | 75 |
| Tetraethylene glycol | 35 |
| Barium hydroxide | 150 |

The above ingredients are mixed together in the amounts and in the order listed.

*Example IV*

| | Parts |
|---|---|
| Sodium resinate | 500 |
| Kerosene | 500 |
| Bentonite | 60 |
| Triethylene glycol | 45 |
| Hydrated lime | 50 |

The sodium resinate employed is the paste-like caustic soda saponification product of wood rosin containing about 70 per cent by weight of sodium resinate and commonly known as "paste size" in the paper-making art. The procedure employed in preparing the concentrate composition is the same as that described in Example I.

*Example V*

The procedure described in Example I is followed except that ethylene glycol is substituted for the diethylene glycol. The composition obtained is a stable homogeneous fluid having an API Funnel viscosity of about 300 seconds at 80° F. A similar composition from which the ethylene glycol is omitted is a stiff paste.

As previously mentioned, the drilling fluid concentrates provided by the invention are readily dispersible in mineral oil such as may be available at or near the well site to form highly efficient drilling fluids. Such oil may be crude oil directly as it comes from a well or it may be a topped crude, i. e., one from which the light ends have been removed by distillation or stripping. It may also be a heavy crude which has been diluted with naphtha or the like to obtain satisfactory viscosity characteristics, or it may be any of a number of intermediate distillate fractions. The drilling fluids prepared from the present concentrates may also comprise a weighting agent. Such agent may be locally obtainable clay or sand, or it may be finely divided calcium carbonate, red lead, iron oxide, barytes, or any of the agents commonly used for such purpose. The selection of the base oil and weighting agent to obtain desired properties in the fluid will be apparent to those skilled in the art.

Other modes of applying the principle of my invention may be employed instead of those explained, change being made as regards the methods herein disclosed or the materials employed, provided the step or steps stated by any of the following claims be employed or the product defined by any of the following claims be obtained.

I, therefore, particularly point out and distinctly claim as my invention:

1. A composition of matter adapted to be dispersed in mineral oil to form a drilling fluid and essentially comprising between about 50 and about 75 per cent weight of a soap selected from the class consisting of heavy metal and alkaline-earth metal resinates and naphthenates, between about 10 and about 25 per cent by weight of a hydratable clay, and an amount of a glycol containing not more than six carbon atoms sufficient to render the composition fluid.

2. A composition of matter adapted to be dispersed in mineral oil to form a drilling fluid and essentially comprising a composition consisting of between about 50 and about 75 per cent by weight of a soap selected from the class consisting of heavy metal and alkaline-earth metal resinates and naphthenates, between about 10 and about 25 per cent by weight of a hydratable clay, and an amount of a glycol containing not more than six carbon atoms sufficient to render the composition fluid, dispersed in from about 70 to about 120 per cent of its weight of a light mineral oil.

3. A composition according to claim 2 wherein the soap is an alkaline-earth metal naphthenate.

4. A composition according to claim 2 wherein the soap is an alkaline-earth metal resinate.

5. A composition according to claim 2 wherein the glycol is diethylene glycol.

6. A composition according to claim 2 wherein the glycol is ethylene glycol.

7. A composition of matter adapted to be dispersed in mineral oil to form a drilling fluid and essentially comprising a composition containing from about 50 to about 75 per cent by weight of a calcium resinate, from about 10 to about 25 per cent by weight of a hydratable clay, and from about 2 to about 10 per cent by weight of a glycol containing not more than six carbon atoms, dispersed in from about 70 to about 120 per cent of its weight of a light mineral oil.

8. A composition according to claim 7 wherein the light mineral oil has a boiling range of about 300° to 750° F.

9. A composition according to claim 7 wherein the glycol is diethylene glycol.

10. A composition according to claim 7 wherein the calcium resinate is the calcium soap of partially decarboxylated wood rosin.

11. A composition according to claim 7 wherein the calcium resinate is prepared by metathesis of calcium hydroxide and a caustic potash saponification product of partially decarboxylated wood rosin, said saponification product comprising about 50 per cent by weight of potassium resinate, about 7 per cent by weight of free resin acids, about 33 per cent by weight of unsaponifiable oils, and about 10 per cent by weight of water.

12. The method of making a composition of matter adapted to be dispersed in mineral oil to form a drilling fluid, said method comprising dispersing about 400 parts by weight of an alkali-metal resinate in from about 350 to about 450 parts by weight of a light mineral oil, and adding from about 50 to about 100 parts by weight of water, from about 30 to about 50 parts by weight of a glycol containing not more than six carbon atoms, from about 50 to about 150 parts by weight of a hydratable clay, and finely divided calcium hydroxide in an amount substantially chemically equivalent to the alkali-metal resinate.

13. The method of claim 12 wherein the alkali-metal resinate is a caustic potash saponification product of partially decarboxylated wood rosin containing about 50 per cent by weight of potassium resinate, from about 30 to about 35 per cent by weight of unsaponifiable oils and the remainder being free resin acids and water.

14. The method of claim 13 wherein the glycol is diethylene glycol and the hydratable clay is bentonite.

PAUL W. FISCHER.

REFERENCES CITED

The following references are of record in the file of this patent:

UNITED STATES PATENTS

| Number | Name | Date |
| --- | --- | --- |
| 2,099,825 | Rolshausen | Nov. 23, 1937 |
| 2,316,967 | Miller | Apr. 20, 1943 |
| 2,329,474 | Lazar et al. | Sept. 14, 1943 |
| 2,361,806 | Merrill | Oct. 31, 1944 |
| 2,430,039 | Anderson | Nov. 4, 1947 |